United States Patent [19]

Burlage et al.

[11] Patent Number: 4,487,076
[45] Date of Patent: Dec. 11, 1984

[54] VORTEX FLOW METER

[75] Inventors: Brian J. Burlage; David E. Wiklund; Gary A. Lenz, all of Marshalltown, Iowa

[73] Assignee: Fisher Controls International, Inc., Marshalltown, Iowa

[21] Appl. No.: 436,426

[22] Filed: Oct. 25, 1982

[51] Int. Cl.³ .............................................. G01F 1/32
[52] U.S. Cl. ................................................ 73/861.24
[58] Field of Search ................ 73/861.24, 861.22, 198, 73/493

[56] References Cited

U.S. PATENT DOCUMENTS

| 3,908,458 | 9/1975 | Pannullo et al. | 73/198 |
| 3,972,232 | 8/1976 | Miller et al. | 73/861.24 |
| 4,248,098 | 2/1981 | Sawayama et al. | |
| 4,329,880 | 5/1982 | Herzl | 73/861.24 |
| 4,339,957 | 7/1982 | Herzl | 73/861.24 |

FOREIGN PATENT DOCUMENTS 0064065  6/1978  Japan ............................... 73/861.24

Primary Examiner—Herbert Goldstein
Assistant Examiner—Brian R. Tumm
Attorney, Agent, or Firm—Allegretti, Newitt, Witcoff & McAndrews, Ltd.

[57] ABSTRACT

An improved flow meter and sensor body therefor, the body having a strain relief portion. A housing of the flow meter defines a fluid flow passage and a sensor body opening. A sensor body mounting portion is mounted to the housing. A sensor body sensor supporting portion is in the fluid flow passage, and supports flow sensor transducers in the fluid flow. The sensor body relief portion is intermediate the sensor body mounting and supporting portions, in the sensor body opening, and adapted to relieve induced strain from external vibration, whereby the flow meter is substantially insensitive to external vibration.

8 Claims, 5 Drawing Figures

4,487,076

VORTEX FLOW METER

BACKGROUND OF THE INVENTION

This invention relates to a volumetric flow meter, and more particularly, to an improved vortex flow meter.

Volumetric flow meters such as vortex flow meters have employed strain gauges, capacitors, piezoelectric disks and the like as flow sensors. Meters of this type have often been sensitive to strain induced by external vibration. The strain has reached the meters through the piping in which the meters have been located, from vibration sources such as wind, control valve turbulence, and reciprocating machinery including compressors and pumps. Transmission of the vibration to the flow sensors has caused strain in the sensors, resulting in erroneous sensor outputs.

SUMMARY OF THE INVENTION

Thus, it is an object of the invention to significantly reduce the vibration sensitivity of flow meters.

Another object is to accomplish the sensitivity reduction by actually reducing the strain transmitted to the sensors, rather than electronically conditioning the sensor signal, to permit the employment of simpler, less expensive electronic circuitry.

Other objects are to accomplish the desired sensitivity reduction with a structure which is compatible with existing flow meters, economical of manufacture, reliable, and resistant to fatigue.

To accomplish these objects, this invention is, in principal aspect, an improved flow meter, and an improved sensor body for a flow meter. The sensor body has a mounting portion, a flow sensor supporting portion and a strain relief portion. The strain relief portion is preferably located intermediate the mounting portion and the sensor supporting portion, and is adapted, as by reduction of stiffness, to relieve induced strain of the sensor supporting portion.

These and other details, aspects, objects and advantages of the invention are fully set forth in the detailed description, which follows.

BRIEF DESCRIPTION OF THE DRAWING

The preferred embodiment of the invention is described below in relation to the accompanying drawing. Briefly, the drawing includes five figures, or FIGS., as follows.

DETAILED DESCRIPTION OF THE PREFERRED EMBODIMENT

Figure 1:
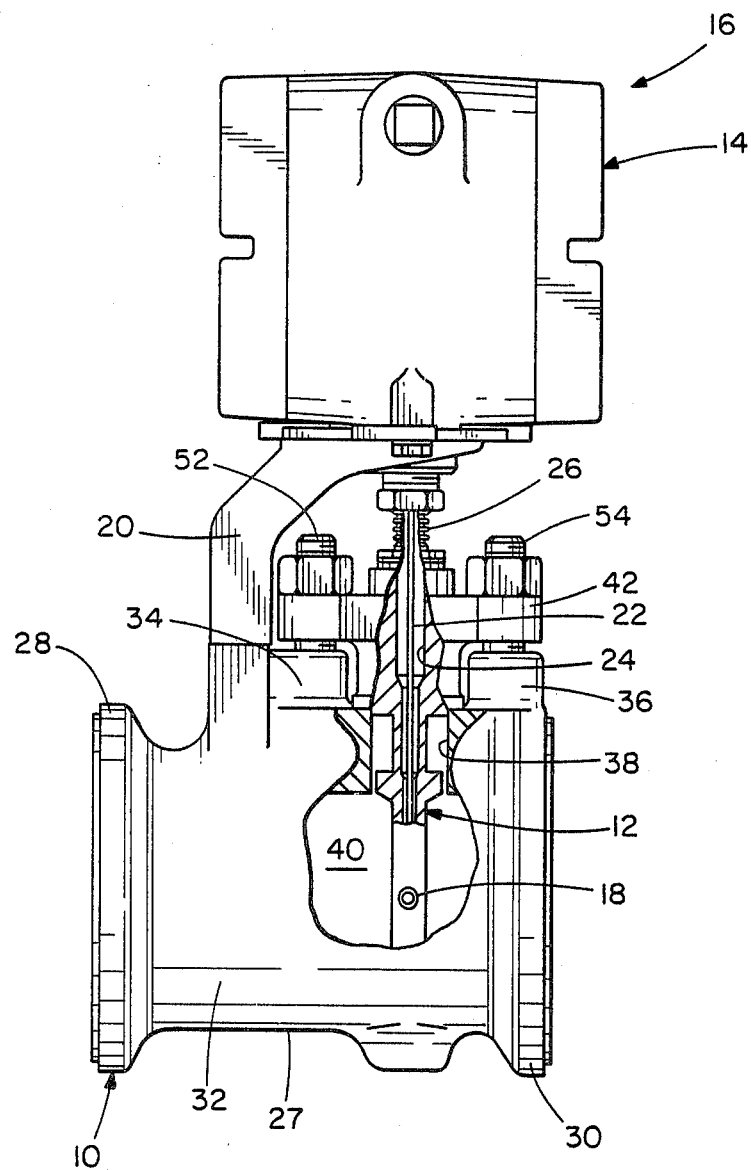
FIG. 1 is a partially cut-away view of a flow transmitter including a signal conditioner and flow meter, which incorporates the sensor body of the preferred embodiment of the invention.

Referring to FIG. 1, the preferred embodiment of the invention is both an improved flow meter 10 and an improved sensor body 12 which may also function as a vortex shedding bluff body. The sensor body 12 is a part of the flow meter 10, which is joined by a signal conditioner 14 to form a flow transmitter 16.

As most preferred, the meter 10 employs piezoelectric disks such as disk 18 as its sensors. Further, as most preferred, the conditioner 14 is cantilevered atop the meter 10 by a bracket 20, and electrical circuitry such as sensor leads 22 join the disks 18 and the conditioner 14. The leads 22 pass through an internal circuitry passage 24 in the body 12 and inside a flexible bellows 26, to reach the conditioner 14.

Concentrating on the meter 10 and body 12, the meter 10 includes a housing 27 of two flanges 28, 30 and a central section 32. Two mounting plates, or bosses, 34, 36 are provided atop the section 32, for mounting of the sensor body 12. A sensor body opening 38 opens into the central fluid passage 40 within the section 32.

Figure 2:
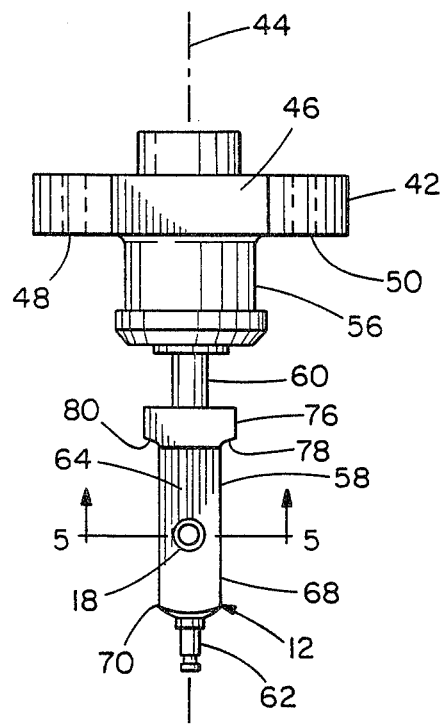
FIG. 2 is a side elevational view of the sensor body of the preferred embodiment.

The sensor body 12 includes a mounting portion 42. The body 12 extends along a central axis 44, as shown in FIG. 2, and the mounting portion 42 includes a flange 46 extending generally perpendicular to the axis 44. The flange 46 provides two fastening areas 48, 50, where fasteners such as the bolts 52, 54 of FIG. 1 are employed to mount and fasten the flange 46, and thereby the body 12, to the mounting plates 34, 36, and thereby the meter housing 27.

A cylindrical section 56 of the mounting portion 42 extends between the plates 34, 36 from the flange 46 to the upper surface of the housing central section 32. When the body 12 is mounted, the section 56 caps the opening 38.

Below the section 56, the sensor body 12 includes a sensor supporting portion 58, an intermediate, strain relief portion 60 and a bottom, retained end 62. The portion 60 is intermediate the portions 42, 58 in that it is between the portions 42, 58. This intermediate location is the preferred location, although it is believed other locations may be possible.

Figure 5:
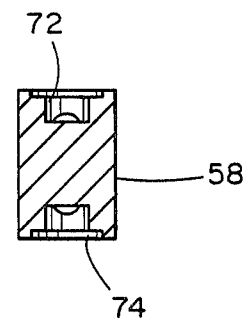
FIG. 5 is a cross-sectional view taken along line 5—5 of FIG. 2.

The sensor supporting portion 58 is rectangular, as best shown in FIG. 5. The portion 58 includes opposed sidewalls 64, 66 and endwalls 68, 70. The sidewalls 64, 66 define sensor receiving recesses 72, 74. The circuitry passage 24 terminates at the recesses 72, 74.

Adjacent the strain relief portion 60, the sensor supporting portion 58 includes an enlarged, generally cylindrical area 76. The opposed bottom surfaces 78, 80 of the area 76 above the endwalls 68, 70 are concave, to blend with the contour of the inner wall of the housing central section 32. As shown in FIG. 1, when the sensor body 12 is properly located in the housing 27, the sensor supporting portion 58 is in the central fluid passage 40, while the enlarged area 76 loosely fits the opening 38, to protect the strain relief portion 60 from fluid turbulence, and to create continuity in the contour of the housing inner wall. Continuity eliminates disruption of the Von Karman vortex street in the fluid passage 40. When the sensor body 12 is properly located in the housing 27, the strain relief portion 60 is thus within the opening 38.

Figure 4:
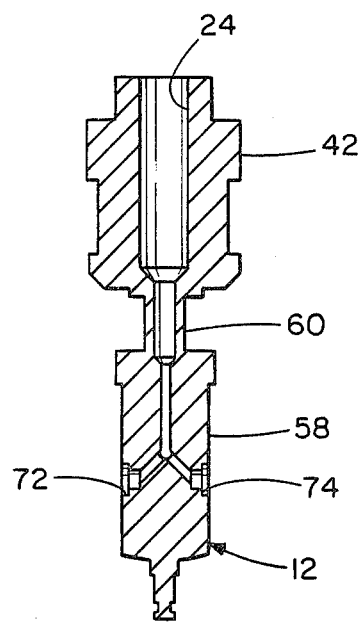
FIG. 4 is a front cross-sectional view of the sensor body.

The strain relief portion 60 is outwardly cylindrical, and as shown in FIGS. 1 and 4, annular. The portion 60 is adapted to relieve strain in the sensor supporting portion 58 from external vibration. Surprisingly, bending moments induced on piping have been the cause of strain on the flow sensors. The moments result in sensor body deflections in the order of millionths of an inch. These deflections, while nearly infintesimal, cause the sensor strain. The strain relief portion 60 "absorbs"

these deflections, leaving the portion 58 only insignificantly deflected.

To so absorb the deflections, the strain relief portion 60 has a stiffness substantially less than that of the sensor supporting portion 58. Thus, the portion 60 acts as a spring. Ideally, the stiffness would be zero and the portion 60 would absorb all of the deflections. In reality, the tolerable deflection of the portion 58 is established for the particular sensors in use, and the portion 60 configured to transmit no more than this deflection. Axial stresses, hydrostatic stresses, operating temperature, material choice and fatigue are also accommodated. Generally, a smaller circuitry opening 24 and, an axially longer and thinner portion 60 are preferred. With a steel body 12, the following characteristics of the portion 60 have been found acceptable: for a pipe size ("size") of one inch, a nominal outer diameter (OD) of 0.207 inches; a nominal inner diameter (ID) of 0.125 inches, and a nominal length (L) of 0.6 inches; for a size of 1½ inches, an OD of 0.308", an ID of 0.188", and a L of 0.7"; for a size of 2 inches, an OD of 0.36", an ID of 0.26", and a L of 0.7; for a size of 3 inches, an OD of 0.44", an ID of 0.26", and a L of 0.6"; for a size of 4 inches, an OD of 0.62"; an ID of 0.5", and a L of 0.5"; and for a size of 6 inches, an OD of 0.844", an ID of 0.624", and a L of 0.7". Tolerances are OD +0.005", ID −0.005", and L +0.006".

Figure 3:
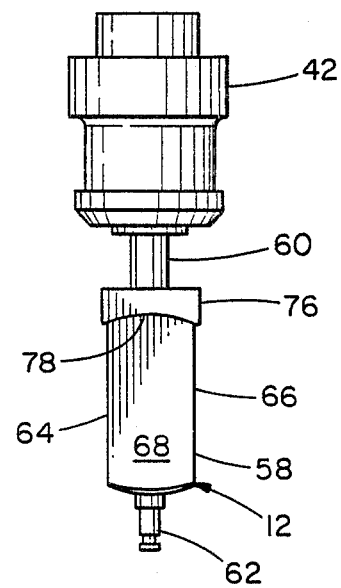
FIG. 3 is a front elevational view of the sensor body.

As drawn, the outer dimension of the portion 60 is substantially less than the outer dimensions of the portion 58. Also, as shown, the strain relief portion 60 is cylindrical, but it will be understood that other shapes may be utilized. Strain relief with such other shapes may be accomplished by having the dimensions of the strain relief portion 60 in the planes of vibration being substantially less than the corresponding dimensions of the sensor supporting portion 58 in the planes of vibration. For example, as shown in FIG. 3, the width of end walls 68, 70 is substantially greater than the corresponding dimension of the strain relief portion 60.

The preferred embodiment is now described. As should be apparent, a variety of changes could be made to the preferred embodiment, without departing from the scope of the invention. Therefore, to particularly point out and distinctly claim the subject matter regarded as invention, the following claims conclude this specification.

What is claimed is:

1. An improved flow meter comprising:
    a housing defining a fluid flow passage and a sensor body opening which opens into the fluid flow passage; and
    flow sensor means for sensing fluid flow in the flow passage and providing a signal in relation to the fluid flow, the flow sensor means being in the fluid flow passage; and
    a sensor body having a mounting portion, a strain relief portion and a flow sensor supporting portion, the mounting portion being mounted to the housing external to the housing and the sensor supporting portion being in the fluid flow passage and supporting the flow sensor means, the strain relief portion being intermediate the mounting portion and the sensor supporting portion, the strain relief portion further being in the sensor body opening and adapted to relieve induced strain of the sensor supporting portion from external vibration, whereby the flow meter is substantially insensitive to external vibration.

2. An improved flow meter as in claim 1 in which the sensor supporting portion includes an enlarged area loosely fit in the sensor body opening, to minimize coupling of vibration from the housing to the flow sensor supporting portion.

3. An improved flow meter as in claim 2 in which the enlarged area includes surfaces which blend with the contour of the housing to create continuity in the contour of the housing at the sensor body opening.

4. An improved flow meter as in claim 1 in which the sensor supporting portion has a first stiffness and the strain relief portion has a second stiffness, the second stiffness being substantially less than the first stiffness.

5. An improved flow meter as in claim 1 in which the sensor supporting portion has a first major outer dimension in a plane of vibration and the strain relief portion has a second outer dimension in the plane of vibration, the second outer dimension being substantially less than the first outer dimension such that the strain relief portion of the body is thin relative to the sensor supporting portion.

6. An improved flow meter as in claim 1 in which the sensor body defines an internal passage for electrical circuitry from the mounting portion to the sensor supporting portion.

7. An improved flow meter as in claim 1 in which the sensor body mounting portion includes a section capping the sensor body opening.

8. In a flow meter having a housing defining a fluid flow passage and a sensor body opening which opens into the fluid flow passage and flow sensor means for sensing fluid flow in the flow passage and providing a signal in relation to the fluid flow, the flow sensor means being in the fluid flow passage, an improved sensor body having a mounting portion adapted for mounting of the body to the housing external to the housing, a sensor supporting portion adapted for supporting the flow sensor means and for being in the fluid flow passage and a strain relief portion intermediate the mounting portion and the sensor supporting portion, the strain relief portion further being adapted for being in the sensor body opening and the strain relief portion adapted to relieve induced strain of the sensor supporting portion caused by external vibration, whereby the flow meter is substantially insensitive to external vibration.

* * * * *